(No Model.)
C. A. KÜNZEL.
FISHING DEVICE.
No. 443,286. Patented Dec. 23, 1890.
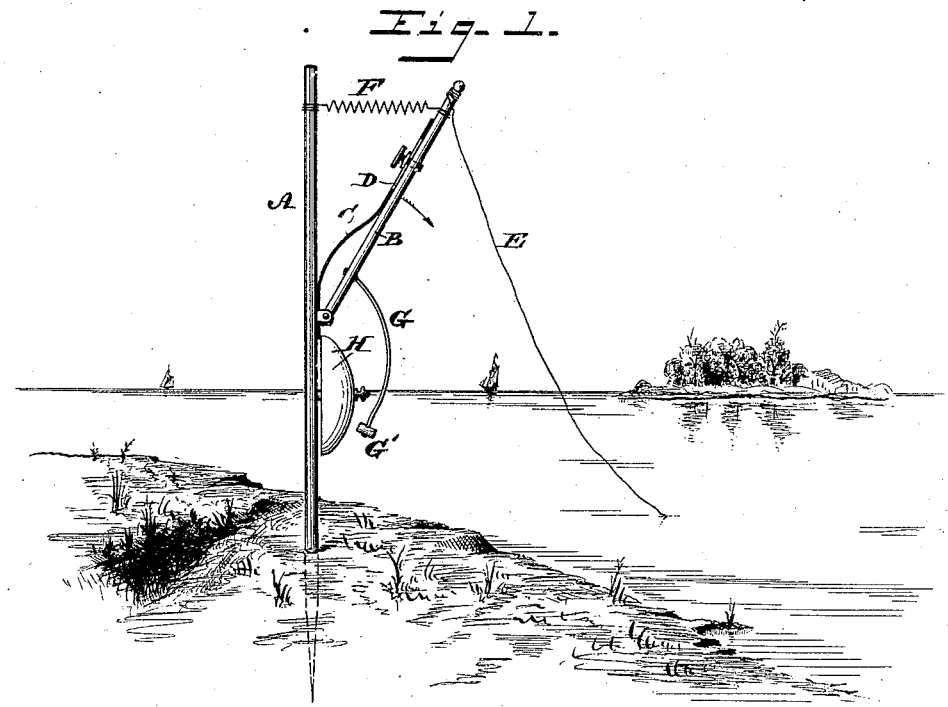
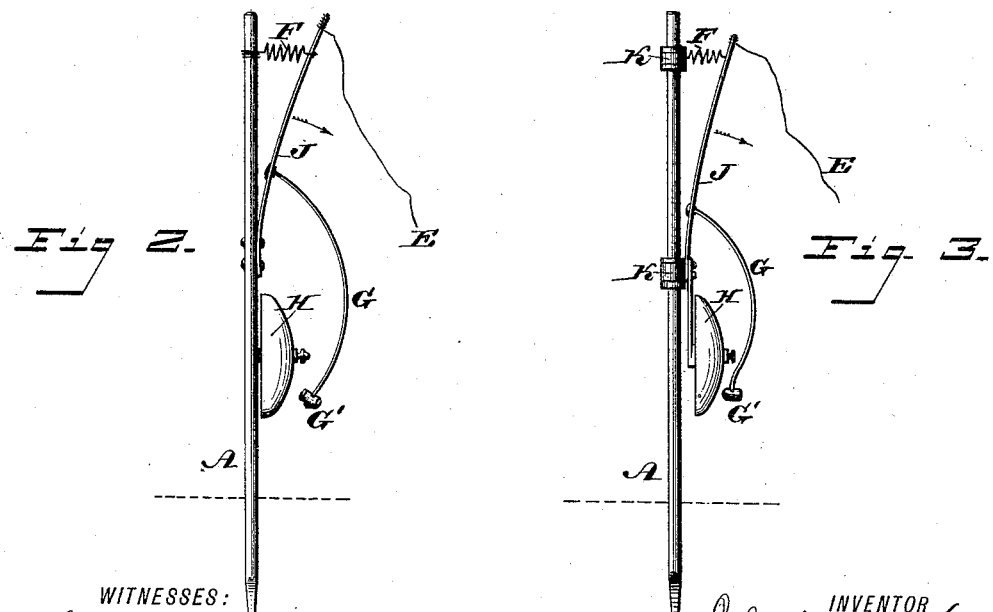
WITNESSES:
L. Douvelle,
A. P. Jennings.
INVENTOR
Charles A. Künzel
BY John A. Wiederstein
ATTORNEY.

UNITED STATES PATENT OFFICE.

CHARLES A. KÜNZEL, OF CAMDEN, NEW JERSEY, ASSIGNOR OF TWO-THIRDS TO JOHN C. OETERS AND JOHN T. UNTERKOEFLER, BOTH OF PHILADELPHIA, PENNSYLVANIA.

FISHING DEVICE.

SPECIFICATION forming part of Letters Patent No. 443,286, dated December 23, 1890.

Application filed August 26, 1890. Serial No. 363,077. (No model.)

*To all whom it may concern:*

Be it known that I, CHARLES A. KÜNZEL, a citizen of the United States, residing in the city and county of Camden, State of New Jersey, have invented a new and useful Improvement in Fishing Devices, which improvement is fully set forth in the following specification and accompanying drawings.

My invention relates to improvements in fishing devices; and it consists, first, of novel means for notifying a party within hearing of a bell or alarm attached to the device of the biting of a fish at a line on said device, and, second, of the combination of parts hereinafter described.

Figure 1 represents a perspective view of a device embodying my invention. Figs. 2 and 3 represent side views of modifications thereof.

Similar letters of reference indicate corresponding parts in the several figures.

Referring to the drawings, A designates a rod having a sharpened lower end for inserting it in the ground or other suitable support, and to its upper end is pivotally attached an arm or lever B, having between it and the rod A a leaf-spring C, with a slot D therein, so that the slotted end may move freely on the said lever when the upper end of the latter is drawn away from the rod by a pull on the line E, which latter is fastened to the upper end of the said lever B. A contractile spring F is secured to the rod A and the lever B, and is adapted to draw the upper end of the latter toward the rod. Secured to the lower end of the lever B is a curved arm G, provided at its free end with a hammer G' for striking the bell H, secured to the rod A, and thereby ringing an alarm.

In Fig. 2, instead of a lever-arm B a spring-arm J, riveted or otherwise fastened at one end to the rod A, is employed, a spring F being connected to the upper end of the spring J and to the rod.

In Fig. 3 the collars K are attached to the inner ends of the springs J and F, so that the same may rotate around the rod A, and thus prevent the twisting or winding of the line on the rod.

It will be seen that the pulling on the line E will draw the upper end of the lever B outwardly, or away from the rod A, and thereby bring the hammer G' of the arm G in contact with the bell H, thus sounding an alarm. When the power or force exerted by the fish in drawing the line outwardly is stopped, the contractile spring F will suddenly draw back the lever B, and with it the line E, so that the fish is hooked. If the rod is secured to a boat or other support on the water, the revolving collars on the rod prevent the winding of the line on the rod and lever.

Having thus described my invention, what I claim as new, and desire to secure by Letters Patent, is—

1. A fishing device consisting of a standard, a lever pivotally attached to said standard, a spring adapted to bear against said lever, a second spring secured to the standard and lever, an arm with a hammer attached to said lever, and a gong on said standard, said parts being combined substantially as described.

2. A fishing device consisting of a standard, a lever pivoted to said standard, a spring connected with said standard and lever and adapted to move freely on said standard or lever, a contractile spring secured to said standard and lever, a gong, and an arm with a hammer, said arm being secured to said lever and said gong to the standard, said parts being combined substantially as described.

3. A fishing device consisting of a standard, a lever pivoted to a rotatable collar thereon, a contractile spring secured to said standard and lever, a gong secured to a rotatable collar, and a hammer-arm secured to said lever, said parts being combined substantially as described.

CHARLES A. KÜNZEL.

Witnesses:
JOHN A. WIEDERSHEIM,
ROBT. ACTON.